(12) United States Patent
Elbaz et al.

(10) Patent No.: US 9,704,079 B2
(45) Date of Patent: Jul. 11, 2017

(54) METHOD FOR PRODUCING A RADIO-FREQUENCY IDENTIFICATION TAG

(71) Applicant: Tagsys, La Ciotat (FR)

(72) Inventors: Didier Elbaz, Marseilles (FR);
Francois Combes, Marseilles (FR);
Franck D'Annunzio, La Ciotat (FR)

(73) Assignee: TAGSYS, La Ciotat (FR)

( * ) Notice: Subject to any disclaimer, the term of this patent is extended or adjusted under 35 U.S.C. 154(b) by 0 days.

(21) Appl. No.: 15/032,336

(22) PCT Filed: Oct. 22, 2014

(86) PCT No.: PCT/FR2014/052688
§ 371 (c)(1),
(2) Date: Jul. 18, 2016

(87) PCT Pub. No.: WO2015/063393
PCT Pub. Date: May 7, 2015

(65) Prior Publication Data
US 2016/0321528 A1    Nov. 3, 2016

(30) Foreign Application Priority Data
Oct. 28, 2013    (FR) ...................... 13 60511

(51) Int. Cl.
*G06K 19/02* (2006.01)
*G06K 19/077* (2006.01)
(52) U.S. Cl.
CPC ......... *G06K 19/027* (2013.01); *G06K 19/022* (2013.01); *G06K 19/07773* (2013.01)
(58) Field of Classification Search
CPC ...... G06K 19/00; G06K 19/02; G06K 19/022; G06K 19/025; G06K 19/027;
(Continued)

(56) References Cited

U.S. PATENT DOCUMENTS

| 5,879,502 A | 3/1999 | Gustafson |
| 5,918,113 A * | 6/1999 | Higashi ............... H01L 21/563 257/E21.503 |

(Continued)

FOREIGN PATENT DOCUMENTS

| DE | 10 2006 01159 | 9/2007 |
| EP | 2 306 371 | 4/2011 |

(Continued)

OTHER PUBLICATIONS

International Search Report dated Feb. 13, 2015 out of corresponding priority Application No. PCT/FR2014/052688 (4 pages).
(Continued)

*Primary Examiner* — Laura Gudorf
(74) *Attorney, Agent, or Firm* — Brinks Gilson & Lione; G. Peter Nichols

(57) ABSTRACT

The invention relates to a method for manufacturing a radio-frequency identification tag comprising a textile material backing intended to receive a radio-frequency identification module coupled with an electrical antenna. The method comprises the following steps:
a) depositing (E1) a thermosetting adhesive on an area of the textile backing,
b) depositing (E2) said electrical antenna (12) on the adhesive layer;
c) depositing (E3) said radio-frequency identification module on the antenna and the adhesive layer, the radio-frequency identification module being positioned so as to be coupled with the antenna and at least partially in contact with the adhesive layer;
d) folding (E4) the textile backing so as to cover said antenna and said radio-frequency identification module; and
e) hot-pressing (E5) the folded textile backing so as to embed at least partially the antenna and the radio-
(Continued)

frequency identification module in the adhesive layer and polymerise at least partially said adhesive layer.

10 Claims, 3 Drawing Sheets

(58) Field of Classification Search
CPC ....... G06K 19/07773; G06K 19/07758; G06K 19/07749; G06K 19/041
See application file for complete search history.

(56) References Cited

U.S. PATENT DOCUMENTS

2006/0139232 A1* 6/2006 Martin ................. G06K 19/027
343/895
2009/0321531 A1* 12/2009 Speich ..................... D06H 1/04
235/492
2011/0114734 A1* 5/2011 Tiedmann .............. G06K 19/02
235/492
2011/0232824 A1* 9/2011 Lolli ................ G06K 19/07718
156/64

FOREIGN PATENT DOCUMENTS

| EP | 2 405 054 | 2/2013 |
| WO | WO 95/33246 | 12/1995 |
| WO | WO 2012/104765 | 8/2012 |
| WO | WO 2012/126063 | 9/2012 |
| WO | WO 2013/093826 | 6/2013 |

OTHER PUBLICATIONS

Written Opinion dated Feb. 13, 2015 out of corresponding priority Application No. PCT/FR2014/052688 (5 pages).

* cited by examiner

METHOD FOR PRODUCING A RADIO-FREQUENCY IDENTIFICATION TAG

This application claims priority to International Application No. PCT/FR2014/052688 filed Oct. 22, 2014 and to French Application No. 1360511 filed Oct. 28, 2013; the entire contents of each are incorporated herein by reference.

BACKGROUND

The present invention relates to the field of radio-frequency identification tags and more particularly the manufacture thereof.

Radio-frequency identification tags also known as RFID tags are well-known for identifying all sorts of goods or objects, notably clothing or any laundry items.

For this purpose, the RFID tag must generally be flexible and be capable of withstanding a certain number of treatments applied throughout the period of use thereof, i.e. repeated washing, ironing and folding operations.

For this type of object, it is known, from the document WO 2012/126063 filed by the present applicant, to embody RFID tags with a particular textile material compatible with ultrasonic welding operations. The RFID tag usually includes a radio-frequency identification module (or RFID module), such as the MUTRAK™ module marketed by TAGSYS, and an external electrical antenna coupled with this module, these two components being attached to a strip of textile material.

The process for manufacturing this tag generally comprises the following steps:

1) weaving the electrical antenna in a strip of textile material; the electrical antenna conventionally consists of two wires of 90 twisted strands of stainless metal alloy and it is woven at the same time as the textile strip or after same; alternatively, the antenna may be sewn onto the textile strip after the weaving thereof;

2) depositing an adhesive layer onto the textile strip at the point where the RFID module is to be attached or on the inside of the RFID module to attach the RFID module at the envisaged location, the RFID module being positioned with respect to the electrical antenna so as to optimise the electromagnetic coupling thereof; the adhesive layer is generally an adhesive performing cold bonding of the RFID module on the textile strip;

3) folding the strip of textile material in half so as to place the RFID module and the electrical antenna between two half-strips of textile material; alternatively, a second textile strip may be affixed to the first strip to cover the RFID module and the antenna;

4) welding the two half-strips or the second strip by ultrasound so as to make same melt at least partially around the RFID module and optionally the electrical antenna so as to hold the RFID module mechanically in position between these two strips or half-strips.

The weaving step is generally preceded by a step for cladding the conductive wires of the antenna to reduce wear by abrasion from the weaving tool of the textile material backing.

This manufacturing method has drawbacks including:

this manufacturing process requires the use of costly fabrics which are compatible with the ultrasonic welding technique; this excludes for example the use of materials such as cotton which do not melt under ultrasonic or heat treatment;

it is necessary to clad the antenna wire to weave same with the textile material in order to reduce wear by abrasion from the weaving tool;

ultrasonic welding is relatively difficult to control in terms of positioning as it is necessary to avoid damaging the antenna and the RFID module; and the manufacturing process comprises numerous steps; the tag is thus complex to embody.

The document WO2013/093826 also describes a method for manufacturing RFID tags wherein the electrical antenna is formed and then deposited on an adhesive layer previously deposited on a paper backing. The RFID module is then connected directly by welding at two points of the electrical antenna. This method has always had the drawback of requiring a welding step that is complex to implement.

The patent EP 2 405 054 also describes a method for embodying RFID tags wherein the textile backing comprises a pocket wherein the RFID module is inserted. This RFID module comprises an RFID chip and a near-field antenna connected to the chip. The tag also comprises a far-field antenna comprising a curved portion enclosing at least partially a circumference of the RFID chip. This far-field antenna is applied by sewing, by laser printing or by bonding to the pocket. The far-field antenna is not protected as it is applied or mounted on the textile backing comprising the pocket. The method further comprises a step for closing, for example by sewing, the pocket, which is complex to carry out on a tag including raised-surface portions (pocket equipped with the RFID module). The same applies for the step for applying the far-field antenna.

SUMMARY

One aim of the invention is that of providing a method for reducing the cost of manufacture of the tags and simplifying the manufacturing process thereof.

For this purpose, the invention relates to a method for manufacturing a radio-frequency identification tag comprising a textile material backing intended to receive a radio-frequency identification module coupled with an electrical antenna, characterised in that in it comprises the following steps:

a) depositing a layer of thermosetting adhesive material on an area of the textile material backing optionally comprising said electrical antenna, said layer of adhesive material being deposited on an area covering at least partially said electrical antenna if said textile material backing already comprises said electrical antenna;

b) if said textile material backing does not comprise the electrical antenna, depositing said electrical antenna on the layer of adhesive material;

c) depositing said radio-frequency identification module on the electrical antenna and the layer of adhesive material, the radio-frequency identification module being positioned so as to be coupled with the electrical antenna and at least partially in contact with the layer of adhesive material;

d) folding the textile material backing or depositing a strip of textile material so as to cover said electrical antenna and said radio-frequency identification module; and e) hot-pressing the folded textile material backing or the textile material backing provided with the textile material strip so as to embed at least partially the electrical antenna and the radio-frequency identification module in the layer of adhesive material and polymerise at least partially said layer of adhesive material.

According to the invention, the polymerisation of the adhesive material gives rise to a material that is stable at least thermally to withstand mechanical and/or chemical laundry cycles (washing, rinsing, drying, etc.). According to the invention, the radio-frequency identification module and the electrical antenna are held in position on the textile material backing by the polymerised layer of adhesive material.

The method does not include an ultrasonic or equivalent welding step. The textile material backing thus does not need to be able to melt under the effect of heat. The range of possible textiles is thus wider and allows the use of less costly textile materials.

According to one embodiment, the textile material is selected from among one of the following materials: cotton, nylon, polyester, viscose, synthetic material.

According to one embodiment wherein the textile material backing is folded into two equal parts, the layer of adhesive material is deposited, before folding, on the entire surface of one of the two parts. Hot-pressing can thus be carried out on the entirety of this surface, simplifying the embodiment thereof greatly.

According to one particular embodiment, the textile material backing is personalised with a logo, said logo being woven with said backing or embroidered or printed on said backing before step a). This graphic personalisation step is then simple to implement (before positioning the antenna and the module). Moreover, as the method does not include a welding step, the final visual quality of the logo is not liable to altered by the subsequent steps.

According to one particular embodiment, the electrical antenna is embodied before depositing on the layer of adhesive material. The electrical antenna can then be formed by folding one or a plurality of wires made of conductive material. Alternatively, it can be embodied by chemical etching, conductive ink-jet printing, conductive ink screen-printing or laser cutting in a sheet of conductive material.

According to a further embodiment, the electrical antenna is, before depositing the layer of adhesive material, woven with said backing or sewn or embroidered onto said backing.

According to a further embodiment, the electrical antenna is formed during the deposition thereof on said layer of adhesive material. It is pre-positioned when hot on said layer of adhesive material.

According to one particular embodiment, the electrical antenna includes at least one meander conductive wire.

According to one particular embodiment, the antenna includes at least one conductive wire comprising a plurality of conductive strands. According to the invention, the conductive wire is flattened during the hot-pressing step so as to obtain a flatter antenna, making it possible to increase the reflective surface area of the antenna (or Delta RCS for Radar Cross Section in the English-language literature) and enhance the radiofrequency characteristics of the radio-frequency identification module.

According to one embodiment, the method further comprises a step for testing and/or a step for inline encoding of said radio-frequency identification module.

According to one particular embodiment, the method further includes a step for adding a stiffening element made of a flexible and resilient material to give the tag, in the absence of force exerted thereon, a predetermined shape. This step may be implemented at various stages of the method.

BRIEF DESCRIPTION OF THE DRAWINGS

Further advantages may further appear to those skilled in the art on reading the examples hereinafter, illustrated by the appended figures, given by way of illustration.

DETAILED DESCRIPTION

Figure 1:
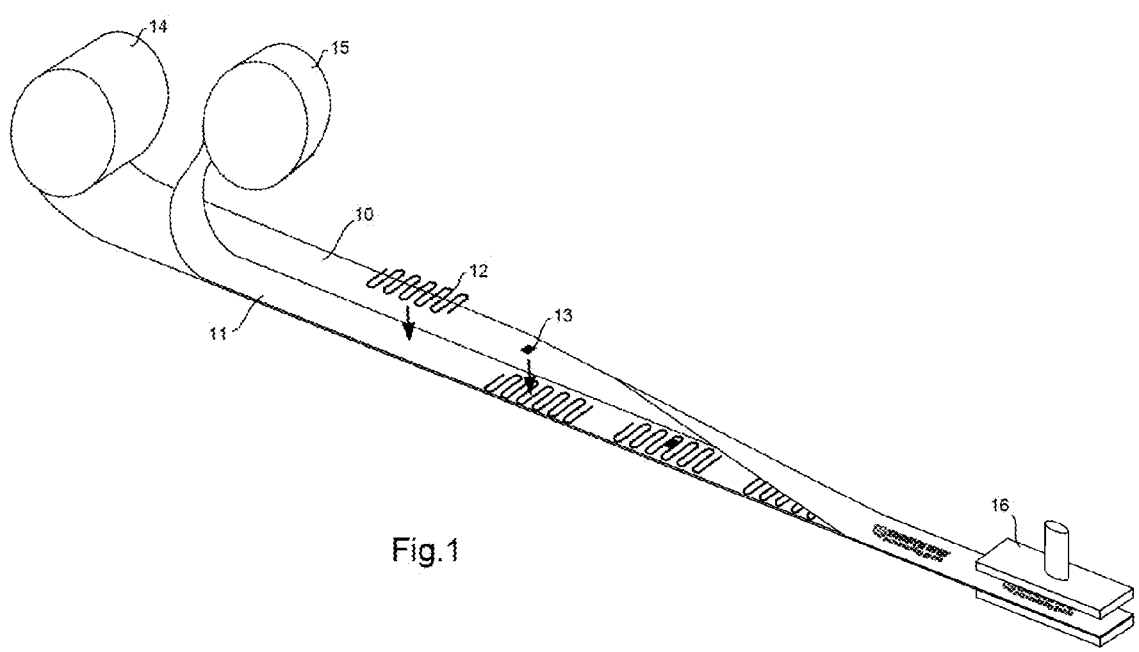
FIG. 1 illustrates schematically the steps of the method according to the invention.
Figure 2:
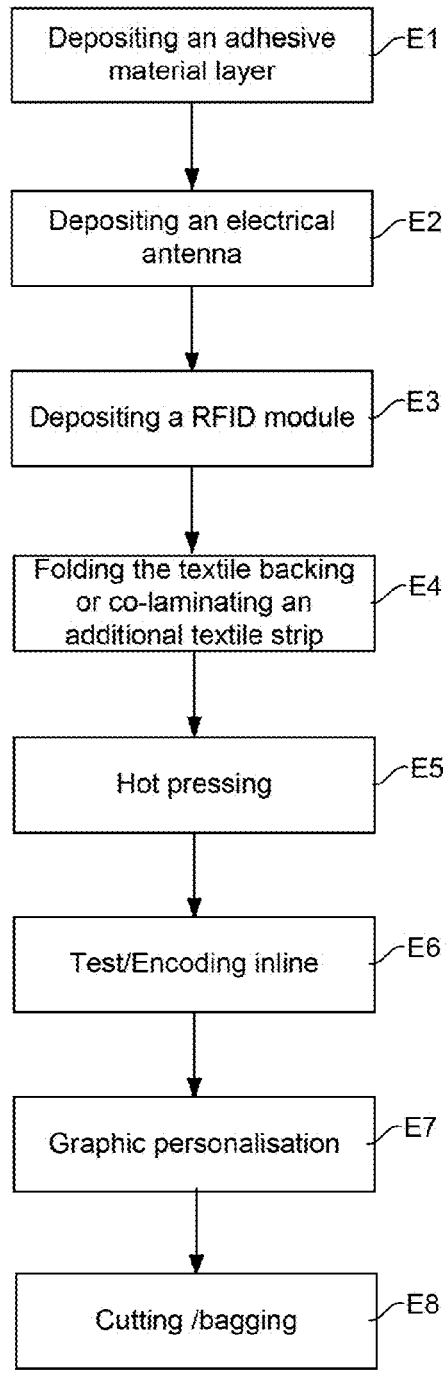
FIG. 2 is a flow chart of the steps of the method according to the invention according to a first embodiment.
Figure 3:
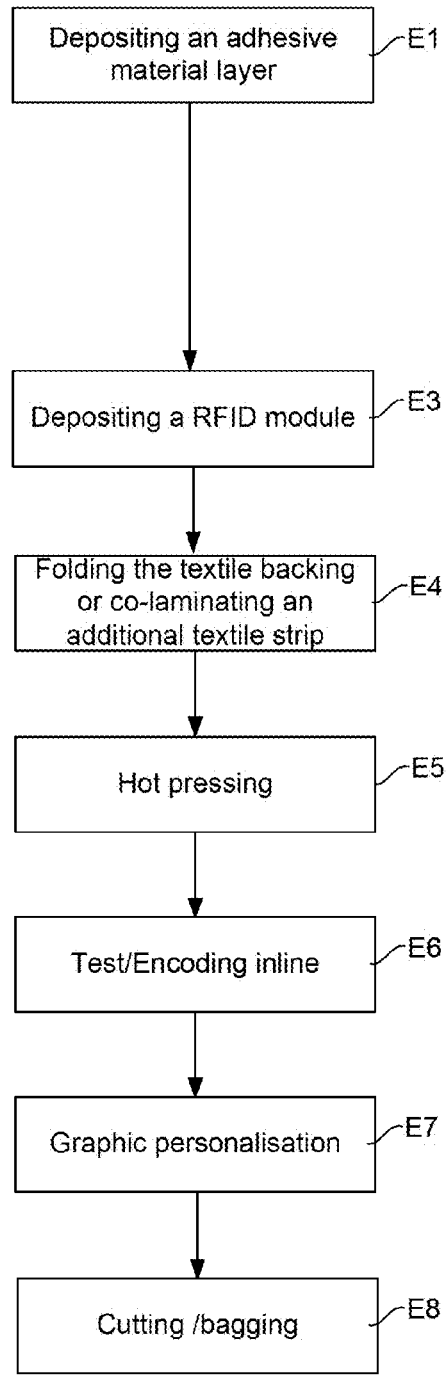
FIG. 3 is a flow chart of the steps of the method according to the invention according to a second embodiment.

According to the invention, the RFID tags can be produced using a textile material with or without an electrical antenna pre-woven or pre-sewn or pre-embroidered with the material. The manufacture of radio-frequency identification tags from a textile material without an electrical antenna is illustrated by FIGS. 1 and 2. The use of a textile material with a pre-woven or pre-sewn electrical antenna is illustrated by FIG. 3.

Reference is first of all made to FIGS. 1 and 2. According to a first step referenced E1, the method according to the invention includes a step for depositing a layer 11 of thermosetting adhesive material on a textile material backing 10 acting as the RFID module backing and the tag antenna.

The backing 10 is presented in the form of a strip obtained from a spool 14 of textile material. The textile material can be standard textile, e.g. cotton, nylon, polyester, viscose or synthetic material. The spool 14 is unwound before depositing the adhesive material.

The layer 11 of adhesive material is deposited at least on one half of the top surface of the backing, for example the lower half, as shown in FIG. 1. It is notably deposited on the area of the backing due to receive the electrical antenna and the RFID module. It is preferably deposited on the half of the top surface of the backing if the latter is folded in half in a subsequent step (step E4) and it is preferably deposited on the entire top surface of the backing if the latter if covered by a second strip of textile material during this subsequent step (step E4).

As illustrated by FIG. 1, the layer of adhesive material is, prior to deposition on the backing, present on the bottom surface of a spooled backing film (spool 15). The bottom surface of the film is pressed against the textile material during the step for depositing the layer of adhesive material and the backing film is removed from the adhesive layer deposited on the textile material.

According to a second step referenced E2, an electrical antenna 12 is deposited on the layer of adhesive material 11.

According to one particular embodiment, the electrical antenna 12 includes two conductive wires having a circular cross-section including 90 twisted strands. The conductive wires advantageously comprise meanders for the purposes of compact design and mechanical strength as illustrated herein.

According to one particular embodiment, the electrical antenna 12 is embodied prior to the deposition thereof on the layer of adhesive material. It can then be formed by folding one or more wires made of conductive material. Alternatively, it can be embodied by chemical etching, conductive ink-jet printing, conductive ink screen-printing or laser cutting in a sheet of conductive material.

According to a further embodiment, the electrical antenna 12 is formed during the deposition thereof on said layer of adhesive material. It is pre-positioned when hot on said layer of adhesive material. This can also be carried out cold if the tack of the adhesive material is sufficient at ambient temperature. This is the case of some adhesives.

According to a further embodiment corresponding to FIG. 3, the electrical antenna 12 is assembled with the textile material prior to depositing the layer of adhesive material. It is for example woven as for the material backing or sewn or embroidered thereon after weaving same. In this embodiment, the method thus does not include a step E2.

According to a third step referenced E3, an RFID module 13 is deposited on the electrical antenna 12 and the layer of adhesive material 11. The RFID module 13 is for example the MUTRAK™ module marketed by TAGSYS.

The RFID module 13 is positioned at the centre of the electrical antenna 12 to optimise the coupling thereof. The bottom surface of the RFID module is at least partially in contact with the layer of adhesive material 11.

According to a fourth step referenced E4, the textile backing 10 is folded in half so as to cover the electrical antenna 12 and the RFID module 13. The top half of the backing is folded back on the bottom half thereof so as to form a textile pocket containing the electrical antenna 12 and the RFID module 13.

Alternatively, instead of folding the backing 10 in half, it can be envisaged to deposit or co-laminate a second textile strip on the backing 10, said second strip having substantially the same width as the backing 10. In this embodiment, during the step E1, the layer of adhesive material 11 is preferably deposited on the entire top surface of the backing 10.

According to a fifth step referenced E5, the folded textile material strip is hot-pressed so as to embed at least partially the electrical antenna 12 and the RFID module in the layer of adhesive material 11 and harden the layer of adhesive material 11.

During the hot pressing, the layer of adhesive material 11 is polymerised at least partially and becomes thermally stable over the tag ranges of use. It is also selected so as not to degrade in contact with water and chemical agents routinely used for laundry. The hot pressing operation makes it possible to press the two parts of the folded backing 10 against one another and press the RFID module 13 against the electrical antenna 12 to obtain satisfactory radio-frequency performances of the RFID module.

The polymerisation of the layer of adhesive material makes it possible to fix the position of the RFID module 13 and the electrical antenna 12 in the textile material backing so that the RFID module and the antenna subsequently retain the mechanical, thermal and radio-frequency performances thereof, particularly after repeated washing, rinsing and drying operations.

Use is advantageously made of a polymeric thermosetting adhesive having two states: a first, so-called adhesive, state between 45° and 100° C. wherein the tack is sufficient to hold an antenna in position and a second, so-called stable, state which is obtained after a heating cycle between 180° and 220° C. followed by cooling. The operation for depositing the electrical antenna and the RFID module is performed when the adhesive is in the adhesive state.

Hot-pressing the electrical antenna 12 also makes it possible to flatten the conductive wires of the antenna so as to obtain a greater equivalent reflective surface area (Delta Radar Cross Section in the English-language literature), which helps enhance the radio-frequency characteristics of the RFID module further.

According to a sixth step referenced E6, the RFID module 13 is tested and then encoded inline.

Various items of information, such as the manufacturer's name and/or logo or the product reference, can be printed on the tag at various stages of the manufacturing process, particularly before step E1 or after the folding step E4 or before the testing and/or inline encoding step E6 or after same.

In FIG. 2, this printing or graphic personalisation step, referenced E7, is performed after the testing and/or inline encoding step E6.

It may be advantageous to carry out this step E7 at an earlier stage, particularly before the step E1, after unwinding the spool of textile material 14 so as not to have to perform printing on a backing comprising raised surface areas, which is the case after the folding step E4. Indeed, it is difficult to obtain printing with sharp outlines when the backing is not flat. In the case of the methods according to the prior art with an ultrasonic welding step, it is not possible to perform the printing step before the welding step as the latter deforms the textile backing and modifies the weaving pitch such that it is not possible to obtain printing with sharp outlines.

According to one particular embodiment, the graphic visual personalisation is performed before step E1 by multicoloured weaving or embroidery, thus reducing the costs of this step and the implementation thereof while having an optimal final visual quality.

According to a seventh step referenced E8, the radio-frequency is cut out and bagged. Alternatively, the tags produced are spooled.

Although not illustrated herein, the method may also include a step for adding a stiffening element made of a flexible and resilient material to give the tag, in the absence of force exerted thereon, a predetermined shape. This element is for example a plane element or a rod or a tube made of silicone. It is intended to ensure that the electrical antenna returns to the original shape thereof when the tag has been folded.

This step can be implemented at various stages of the method. If it is sought for the stiffening element to be covered by the textile backing and bonded thereto by the layer 11 of adhesive material, the adhesive layer is preferably deposited on the entire textile backing 10. The antenna 12 and the RFID module are deposited on the bottom half of the backing and the stiffening element is deposited on the top half before folding. The deposition of this stiffening element is then carried out between step E1 and step E4.

It is also possible to add this stiffening element after the folding step E4. It is then attached to an outer surface of the tag by any suitable means (bonding, etc.)

All these steps are implemented on a production line intended to produce a large number of RFID tags at a high throughput. Two examples of production lines are represented schematically in FIGS. 4 and 5. The common devices to both production lines have the same references in both figures.

Figure 4:
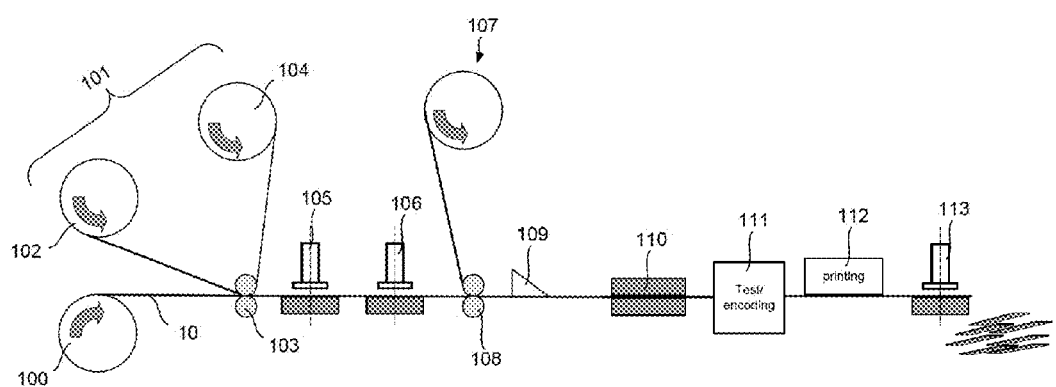
FIG. 4 is a schematic view of a first production line suitable for implementing the method according to the invention.
Figure 5:
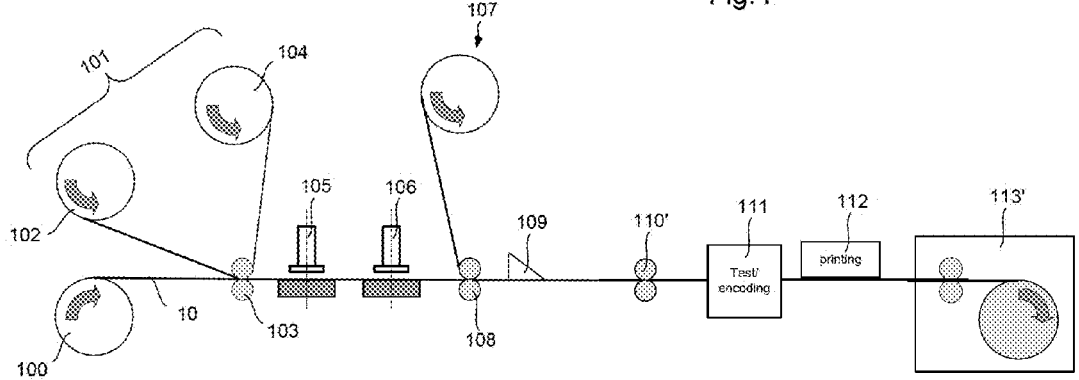
FIG. 5 is a schematic view of a second production line suitable for implementing the method according to the invention.

The production line comprises:

an unwinder 100 suitable for unwinding a spool of textile material, this material being intended to form the backing 10 of the tag;

a unit 101 for depositing the layer of adhesive material 11 onto the backing 10; this unit comprises for example an unwinder 102 suitable for unwinding a spool of thermosetting adhesive material provided with a protective film on the top surface of the adhesive material, rollers 103 to apply the bottom surface of the adhesive material against the top surface of the textile backing and a winder 104 whereon the protective film is wound;

a unit 105 for depositing the electrical antenna on the layer of adhesive material;

a unit 106 for depositing the RFID module on the antenna;

a unit 107 for depositing a stiffening element on or beside the antenna and the RFID module; this stiffening element is for example a tube made of resilient silicone which is unwound from a spool and is deposited by means of rollers 108 on the backing;

a station 109 for folding the textile backing;

a unit 110 or 110' for hot-pressing the folded backing; in FIG. 4, this unit comprises a heated plate pressing the folded backing against an anvil; in FIG. 5, this unit includes two heated rollers arranged above and below the folded backing in order to press said backing;

a unit 111 for testing and inline encoding the RFID module of the tags, a unit 112 for laser printing or marking to print or mark information on the tags; and a unit 113 for cutting out and bagging the tags (FIG. 4) or a unit 113' for spooling the strip of tags obtained from the preceding step (FIG. 5).

The embodiments described above have been given by way of example. It is obvious for those skilled in the art that they can be modified. Some steps such as the step for adding the stiffening element and/or the step for testing/inline encoding and/or the printing step can be removed.

The invention claimed is:

1. A method for manufacturing a radio-frequency identification tag comprising a textile material backing intended to receive a radio-frequency identification module coupled with an electrical antenna comprising:
   a) depositing a layer of thermosetting adhesive material on an area of the textile material backing optionally comprising the electrical antenna, the layer of adhesive material being deposited on an area covering at least partially the electrical antenna if the textile material backing already comprises the electrical antenna;
   b) if the textile material backing does not comprise the electrical antenna, depositing the electrical antenna on the layer of adhesive material;
   c) depositing the radio-frequency identification module on the electrical antenna and the layer of adhesive material, the radio-frequency identification module being positioned to be coupled with the electrical antenna and at least partially in contact with the layer of adhesive material;
   d) folding the textile material backing into two equal parts or depositing a strip of textile material to cover the electrical antenna and the radio-frequency identification module, wherein when the textile material backing is folded into two equal parts, the layer of adhesive material is deposited, before folding, on an entire top surface of one of the two parts and, when a strip of textile material is deposited onto the textile material backing, the layer of adhesive material is deposited on the entire top surface of the textile material backing; and
   e) hot-pressing the folded textile material backing or the textile material backing provided with the textile material strip to embed at least partially the electrical antenna and the radio-frequency identification module in the layer of adhesive material, to polymerize at least partially the layer of adhesive material, and to press the two parts of the folded backing against one another or the strip of textile material against the textile material backing.

2. The method according to claim 1, wherein the textile material is selected from the group comprising cotton, nylon, polyester, viscose, or synthetic material.

3. The method according to claim 1, wherein the textile material backing is personalized with a logo, the logo being woven with the backing or embroidered or printed on the backing before step a).

4. The method according to claim 1, wherein the electrical antenna is embodied before depositing on the layer of adhesive material.

5. The method according to claim 1, wherein the textile material backing being previously equipped with the electrical antenna, the electrical antenna is woven with the backing or sewn or embroidered onto the backing.

6. The method according to claim 1, wherein the electrical antenna is formed during the deposition thereof on the layer of adhesive material.

7. The method according to claim 1, wherein the electrical antenna includes at least one meander conductive wire.

8. The method according to claim 1, wherein the electrical antenna includes at least one conductive wire comprising a plurality of conductive strands.

9. The method according to claim 1, further comprising a step for testing and/or a step for inline encoding of the radio-frequency identification module.

10. The method according to claim 1, further comprising a step for adding a stiffening element made of a flexible and resilient material to give the tag, in the absence of force exerted thereon, a predetermined shape.

* * * * *